July 2, 1935.                C. E. DORSEY, JR                    2,007,041
                    FIFTH WHEEL AND TRAILER CONNECTION
                      Filed Sept. 11, 1933          2 Sheets-Sheet 1
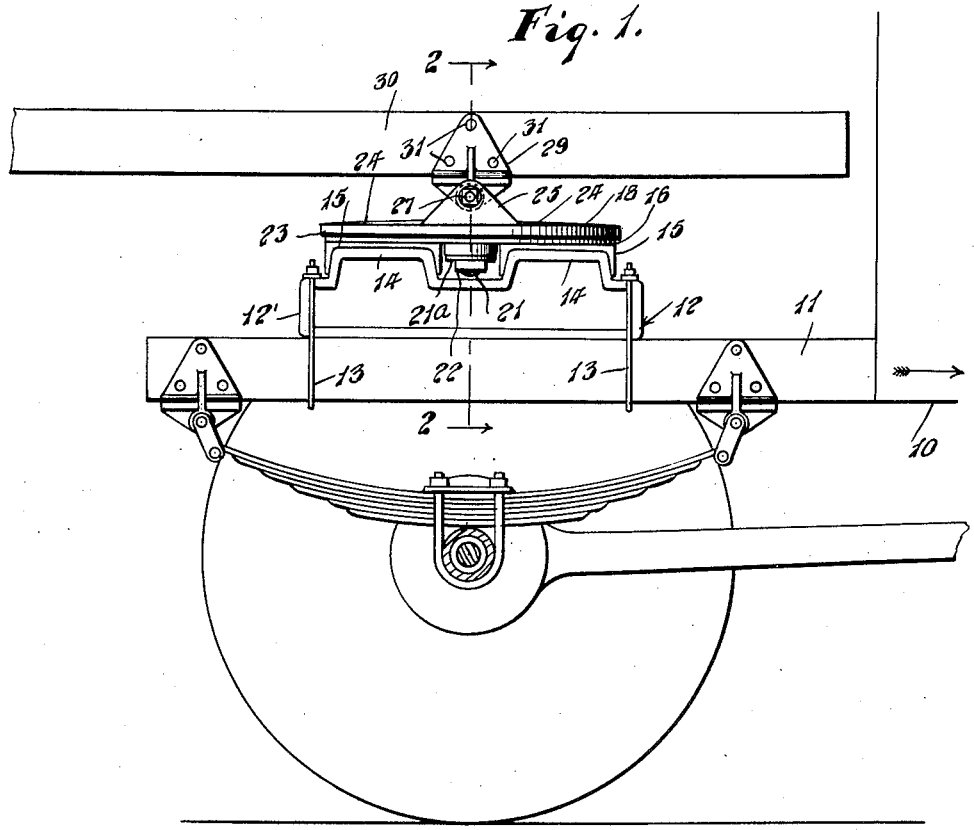
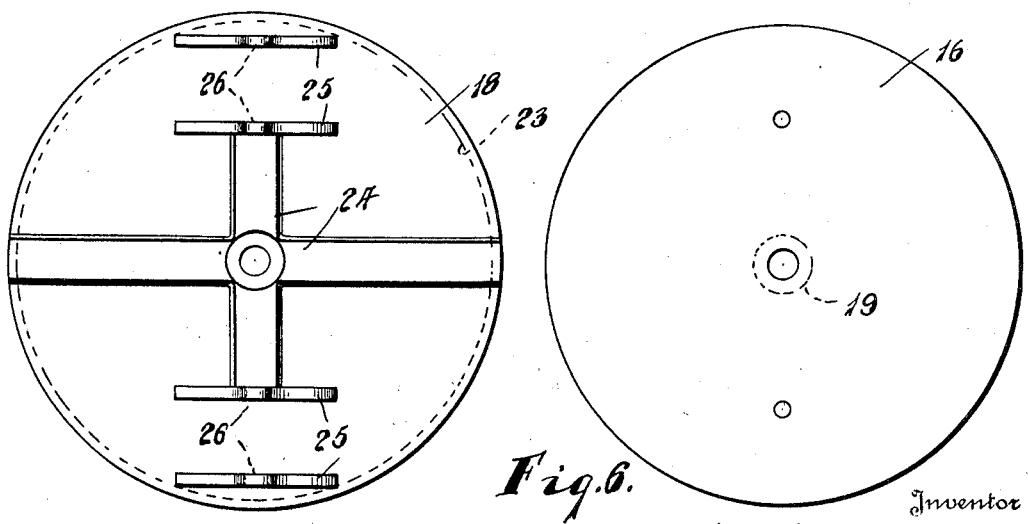
Inventor
C. E. Dorsey, Jr.
Attorney July 2, 1935. C. E. DORSEY, JR 2,007,041
FIFTH WHEEL AND TRAILER CONNECTION
Filed Sept. 11, 1933 2 Sheets-Sheet 2

Inventor
C. E. Dorsey, Jr.
By L. F. Randolph, Jr.
Attorney

Patented July 2, 1935

2,007,041

UNITED STATES PATENT OFFICE 2,007,041

FIFTH WHEEL AND TRAILER CONNECTION

Claude E. Dorsey, Jr., Elba, Ala.

Application September 11, 1933, Serial No. 689,019

3 Claims. (Cl. 308—137)

This invention relates to a fifth wheel construction primarily adapted as a connection between a truck and trailer or semi-trailer.

It is primarily aimed to provide a novel construction capable of manufacture completely of metal, preferably steel, which is fully enclosed and protected against road and weather hazards, and which has a tilting movement.

It is particularly aimed to provide a construction wherein the king bolt is relieved of the pull and the same carried by an integral part of one of the fifth wheel sections.

The more specific objects and advantages will become apparent from a consideration of the description following taken in connection with accompanying drawings illustrating an operative embodiment.

In said drawings:—

Figure 1 is a view in side elevation illustrating the fifth wheel construction connecting a trailer or semi-trailer to a truck;

Figure 5 is a plan view of the upper fifth wheel section detached, and

Figure 6 is a plan view of the lower section of the fifth wheel construction.

Figure 2:
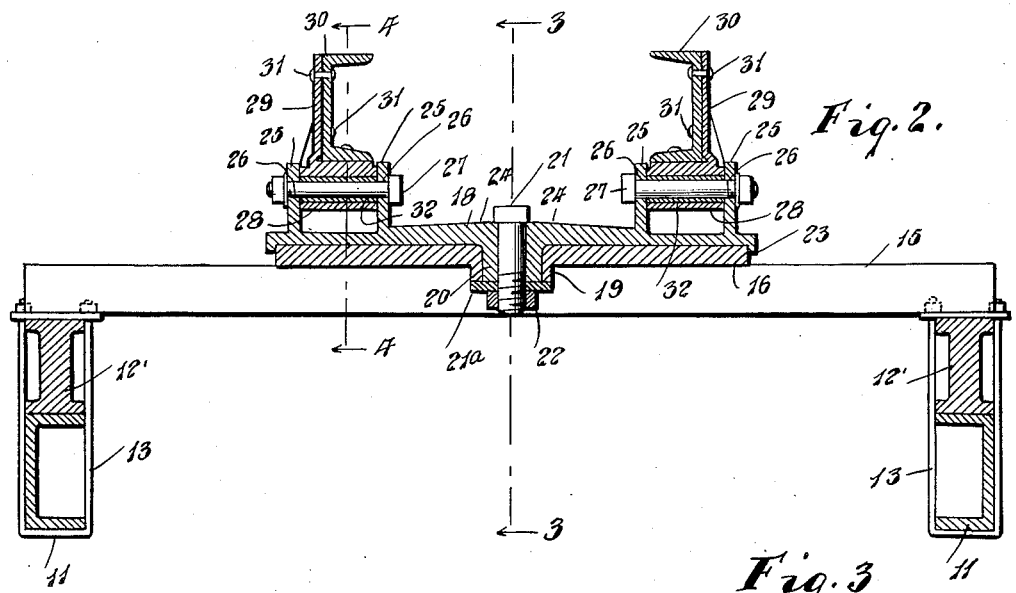
Figure 2 is a cross sectional view taken on the line 2—2 of Figure 1.
Figure 3:
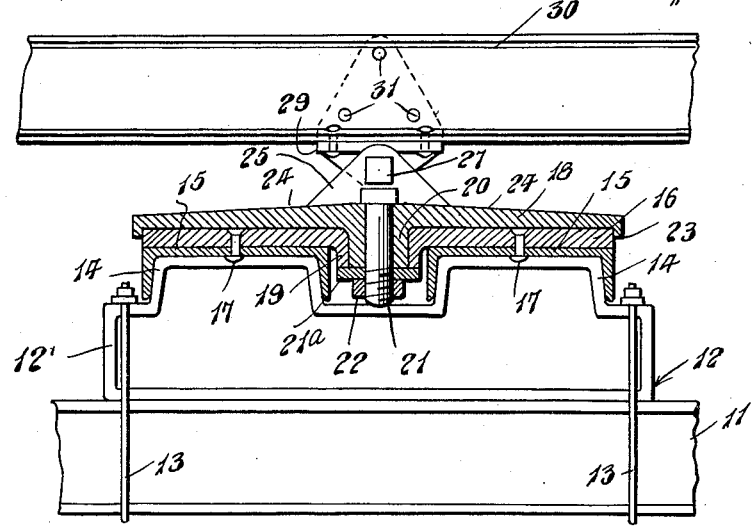
Figure 3 is a cross sectional view taken on the line 3—3 of Figure 2.
Figure 4:
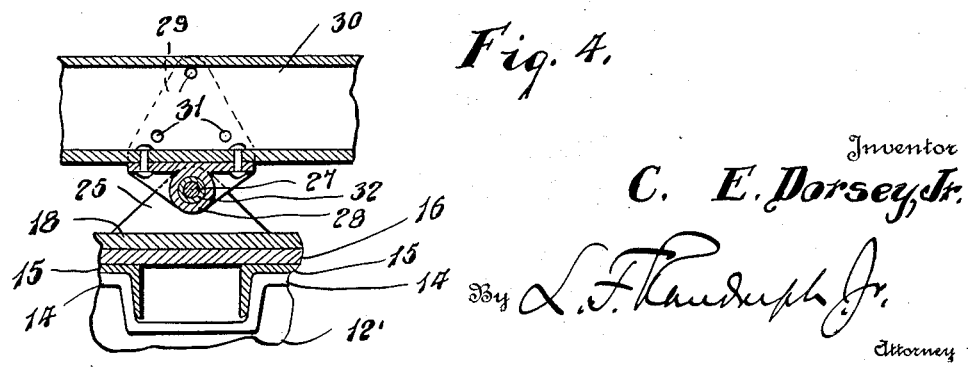
Figure 4 is a cross sectional view taken on the line 4—4 of Figure 2.

Referring specifically to the drawings, 10 designates a conventional truck, the rear portion only being shown. The main or parallel chassis beams of such truck are shown at 11.

As a part of my invention, a suitable base 12, comprising bolsters 12', is attached to the beams 11, preferably removably, by means of U-bolts 13, which surround the beams 11. Such base 12 is preferably metallic, being of any desired shape and size, with its lower surface flat, round, or of any preferred shape, according to the contour of the beams 11 or other surface to which the same is adapted to be attached. Base 12 at the top has two parallel transversely extending raised portions 14 interfitted snugly into the channels of channel beam sections 15, welded or otherwise rigidly secured thereto. Surmounting the beam sections 15 is a lower fifth wheel section 16 preferably riveted as at 17 to the channel sections 15.

Turnable on and relatively to the section 16 is an upper fifth wheel section 18. Section 16 has a tubular hub 19 depending therefrom and the section 18 has a depending tubular hub 20 snugly fitting the hub 19 and journaled therein. A king bolt 21 is passed through the hub 20 and below the hubs 19 and 20, passes through a washer 21ª beneath which is a securing nut 22 threaded on the bolt 21. Section 18 has a depending annular or marginal flange at 23 engaging the periphery of the section 16.

On the upper surface of the fifth wheel section 18 are reinforcing ribs 24.

Preferably integral with the upper fifth wheel section 18 are pairs of ears or lugs 25 having openings 26 therethrough removably accommodating pivot bolts 27. Said bolts 27 pass through openings in bearing portions 28 of brackets 29, which are preferably of L-shape as shown and adapted to be connected to forward portions of parallel or equivalent side beams 30 of the chassis of a trailer, or semi-trailer, that is, a trailer having only two wheels, or four wheels or even more. The beams 30 of course are conventional portions of the chassis or such a trailer or semi-trailer.

Specifically, the brackets 29 are preferably riveted at 31 to said chassis beams 30. The bearing portions 28 also preferably have bronze bushings 32 therein directly engaged by the bolts 27.

As a result of the construction described, the load of the trailer pulls on the hub 20, thus an integral part of the upper fifth wheel section and the pull on the lower section 16 is against the base, particularly the raised portions 14 thereof. The bolt 21 is used primarily for safety purposes in preventing danger of accidental detachment of the fifth wheel section. It will be realized that the fifth wheel has a movement on a transverse horizontal axis, afforded by the bolts 27.

Also the fifth wheel structure is enclosed whereby it is protected against the road and weather hazards.

Attention is called to the fact that all parts constituting my invention are capable of manufacture from metal, preferably steel.

Various changes may be resorted to provided they fall within the spirit and scope of the invention.

I claim as my invention:—

1. A fifth wheel construction comprising bolsters having spaced raised portions, inverted channel beams fitting said raised portions and disposed in spaced relation, a fifth wheel section connected to the upper surfaces of the beams, a second fifth wheel section, said second fifth wheel section being uppermost and having a hub journaled in the first fifth wheel section between said beams and extending below the upper surfaces of said beams, said hub being integral with the second fifth wheel section, and a depending marginal flange integral with the second fifth wheel section peripherally surrounding the first fifth wheel section, means passing through the hub securing the sections together, upstanding ears integral with the second fifth wheel section, and attaching brackets to which said ears are pivoted on an axis intersecting the pivotal axis of the fifth wheel section.

2. A fifth wheel construction of the class described comprising bolsters in parallel spaced relation, said bolsters having raised portions in spaced relation, inverted channel members in spaced relation fitting over said raised portions, and a fifth wheel section supported on the channel members intermediate said bolsters.

3. A fifth wheel construction according to claim 1 wherein each bolster has reduced portions extending outwardly beyond the fifth wheel sections so that the same may be embraced by U-bolts to secure them to a supporting beam.

CLAUDE E. DORSEY, Jr.